(12) United States Patent
Bajpai et al.

(10) Patent No.: US 10,193,903 B1
(45) Date of Patent: Jan. 29, 2019

(54) SYSTEMS AND METHODS FOR DETECTING SUSPICIOUS MICROCONTROLLER MESSAGES

(71) Applicant: Symantec Corporation, Mountain View, CA (US)

(72) Inventors: Vishal Bajpai, Mountain View, CA (US); Preeti Agarwal, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 177 days.

(21) Appl. No.: 15/143,284

(22) Filed: Apr. 29, 2016

(51) Int. Cl.
*H04L 29/06* (2006.01)
*H04L 12/40* (2006.01)

(52) U.S. Cl.
CPC ...... *H04L 63/1416* (2013.01); *H04L 63/1425* (2013.01); *H04L 2012/40215* (2013.01); *H04L 2012/40273* (2013.01)

(58) Field of Classification Search
CPC ............. H04L 63/1416; H04L 63/1425; H04L 2012/40215; H04L 2012/40273; H04L 63/1433; H04L 63/145
See application file for complete search history.

(56) References Cited

U.S. PATENT DOCUMENTS

| 7,015,811 | B2 | 3/2006 | Decker et al. |
| 7,475,124 | B2 | 1/2009 | Jiang et al. |
| 7,673,074 | B1 | 3/2010 | Sebastian et al. |
| 7,861,300 | B2 | 12/2010 | Arnold et al. |
| 8,104,090 | B1 | 1/2012 | Pavlyushchik |
| 8,126,891 | B2 | 2/2012 | Laxman et al. |
| 8,341,745 | B1 | 12/2012 | Chau et al. |
| 8,544,087 | B1 | 9/2013 | Eskin et al. |
| 8,566,938 | B1 | 10/2013 | Prakash et al. |
| 8,925,037 | B2 | 12/2014 | Marino et al. |
| 8,973,133 | B1 | 3/2015 | Cooley |
| 9,053,516 | B2 | 6/2015 | Stempora |

(Continued)

FOREIGN PATENT DOCUMENTS

| CN | 102571469 A | 7/2012 |
| CN | 102893289 A | 1/2013 |
| EP | 2515250 A1 | 10/2012 |

OTHER PUBLICATIONS

Larson et al., An Approach to Specification based Attack Detection for in Vehicle Networks, IEEE (Year: 2008).*

(Continued)

*Primary Examiner* — Hadi S Armouche
*Assistant Examiner* — Huan V Doan
(74) *Attorney, Agent, or Firm* — Fisher Broyles, LLP

(57) ABSTRACT

The disclosed computer-implemented method for detecting suspicious microcontroller messages may include (1) observing a typical interval at which messages are sent over a network by a microcontroller, (2) identifying a message sent over the network by the microcontroller, (3) determining that the interval between the message and the previous message sent by the microcontroller does not comprise the typical interval, and (4) categorizing the message as a suspicious message in response to determining that the interval does not comprise the typical interval. Various other methods, systems, and computer-readable media are also disclosed.

20 Claims, 6 Drawing Sheets

(56) References Cited

U.S. PATENT DOCUMENTS

| | | | |
|---|---|---|---|
| 9,088,560 B1 | 7/2015 | Newstadt et al. | |
| 9,141,790 B2 | 9/2015 | Roundy et al. | |
| 9,148,441 B1 | 9/2015 | Tamersoy et al. | |
| 9,166,997 B1 | 10/2015 | Guo et al. | |
| 9,256,739 B1 | 2/2016 | Roundy et al. | |
| 9,332,030 B1 | 5/2016 | Pereira | |
| 9,380,070 B1* | 6/2016 | Cain | H04L 63/1416 |
| 9,384,066 B1 | 7/2016 | Leita et al. | |
| 9,473,380 B1 | 10/2016 | Bermudez et al. | |
| 9,529,990 B2 | 12/2016 | Newstadt et al. | |
| 9,582,669 B1 | 2/2017 | Shen et al. | |
| 2002/0124089 A1 | 9/2002 | Aiken et al. | |
| 2004/0029556 A1* | 2/2004 | Goto | B60L 3/12 455/404.1 |
| 2004/0044771 A1 | 3/2004 | Allred et al. | |
| 2004/0059822 A1 | 3/2004 | Jiang et al. | |
| 2005/0030969 A1 | 2/2005 | Fredriksson | |
| 2005/0138413 A1 | 6/2005 | Lippmann et al. | |
| 2006/0095573 A1 | 5/2006 | Carle et al. | |
| 2006/0236374 A1 | 10/2006 | Hartman | |
| 2008/0088408 A1 | 4/2008 | Backman | |
| 2008/0134327 A1 | 6/2008 | Bharrat et al. | |
| 2009/0144308 A1 | 6/2009 | Huie et al. | |
| 2009/0157365 A1 | 6/2009 | Higuchi et al. | |
| 2010/0186088 A1 | 7/2010 | Banerjee et al. | |
| 2010/0192226 A1 | 7/2010 | Noel et al. | |
| 2010/0235879 A1 | 9/2010 | Burnside et al. | |
| 2011/0019774 A1 | 1/2011 | Furuta | |
| 2011/0047620 A1 | 2/2011 | Mahaffey et al. | |
| 2011/0083180 A1 | 4/2011 | Mashevsky et al. | |
| 2011/0302656 A1 | 12/2011 | El-Moussa | |
| 2011/0314546 A1 | 12/2011 | Aziz et al. | |
| 2011/0320617 A1 | 12/2011 | Annamalaisami et al. | |
| 2012/0144468 A1 | 6/2012 | Pratt et al. | |
| 2012/0233683 A1 | 9/2012 | Ibrahim et al. | |
| 2013/0031037 A1 | 1/2013 | Brandt et al. | |
| 2013/0042294 A1 | 2/2013 | Colvin et al. | |
| 2013/0212659 A1 | 8/2013 | Maher et al. | |
| 2013/0333032 A1 | 12/2013 | Delatorre et al. | |
| 2014/0165191 A1* | 6/2014 | Ahn | H04L 67/12 726/22 |
| 2014/0226664 A1 | 8/2014 | Chen et al. | |
| 2014/0258379 A1 | 9/2014 | L'Heureux et al. | |
| 2014/0330977 A1 | 11/2014 | van Bemmel | |
| 2014/0365646 A1 | 12/2014 | Xiong | |
| 2015/0113638 A1* | 4/2015 | Valasek | H04L 63/1408 726/22 |
| 2015/0150124 A1 | 5/2015 | Zhang et al. | |
| 2015/0261655 A1 | 9/2015 | Versteeg et al. | |
| 2015/0281047 A1 | 10/2015 | Raju et al. | |
| 2016/0197944 A1* | 7/2016 | Allouche | H04L 63/1416 726/23 |
| 2016/0261482 A1 | 9/2016 | Mixer et al. | |
| 2017/0013005 A1* | 1/2017 | Galula | H04L 63/1425 |
| 2017/0026386 A1* | 1/2017 | Unagami | B60R 16/023 |
| 2017/0118234 A1 | 4/2017 | Arora et al. | |
| 2017/0286675 A1* | 10/2017 | Shin | G06F 21/558 |

OTHER PUBLICATIONS

Kleberger et al, Security Aspects of the In-Vehicle Network in the Connected Car, IEEE, 6 pages (Year: 2014).*

Checkoway et al., Comprehensive Experimental Analyses of Automotive Attack Surfaces, 16 pages (Year: 2011).*

Hoppe et al., Security threats to automotive CAN networks, 15 pages (Year: 2010).*

Mahoney, Network traffic anomaly detection based on packet bytes, Proceedings of the 2003 ACM symposium on Applied computing, pp. 346-350, Mar. 9, 2003.

Balthrop et al., Revisiting LISYS: Parameters and Normal Behavior, Proceedings of the 2002 Congress on Evolutionary Computation, pp. 1045-1050, May 12, 2002.

Lee et al., Data mining approaches for intrusion detection, Proceedings of the 7th conference on USENIX Security Symposium—vol. 7, p. 6, Jan. 26, 1998.

Clifton et al., Developing custom intrusion detection filters using data mining, MILCOM 2000. 21st Century Military Communications Conference Proceedings, vol. 1, pp. 440-443, Oct. 22, 2000.

Bloedorn et al., Data Mining for Improving Intrusion Detection, http://www.mitre.org/sites/default/files/pdf/bloedorn_spss.pdf, Sep. 18, 2015.

Lee et al., Information-theoretic measures for anomaly detection, 2001 IEEE Symposium on Security and Privacy, pp. 130-143, May 13, 2001.

Yang et al., Anomaly detection and diagnosis in grid environments, Proceedings of the 2007 ACM/IEEE conference on Supercomputing, p. 33, Nov. 10, 2007.

Wang et al., Anomalous Payload-Based Network Intrusion Detection, Seventh International Workshop on Recent Advances in Intrusion Detection, pp. 203-222, Sep. 15, 2004.

Dussel et al., Cyber-Critical Infrastructure Protection Using Real-Time Payload-Based Anomaly Detection, 4th International Workshop on Critical Information Infrastructures Security, pp. 85-97, Sep. 30, 2009.

Tongaonkar et al., Towards self adaptive network traffic classification, Computer Communications, vol. 56, pp. 35-46, Feb. 1, 2015.

Bermudez et al., Automatic protocol field inference for deeper protocol understanding, IFIP Networking Conference (IFIP Networking), 2015, pp. 1-9, May 20, 2015.

Taylor et al., Frequency-based anomaly detection for the automotive CAN bus, 2015 World Congress on Industrial Control Systems Security (WCICS), pp. 45-49, Dec. 14, 2015.

Theissler, Anomaly detection in recordings from in-vehicle networks. pdf, Big Data Applications and Principles, First International Workshop, BIGDAP 2014, Madrid, Spain, Sep. 11, 2014.

Muter et al., A structured approach to anomaly detection for in-vehicle networks, 2010 Sixth International Conference on Information Assurance and Security (IAS), Atlanta, GA, pp. 92-98, Aug. 23, 2010.

Kleberger; Security Aspects of the In-Vehicle Network in the Connected Car; Intelligent Vehicles Symposium (IV), 2011 IEEE, Baden-Baden, Germany, reference: pp. 528-533, Jun. 5-9, 2011.

Muter; Entropy-based anomaly detection for in-vehicle networks; 2011 IEEE Intelligent Vehicles Symposium (IV), DOI: 10.1109/IVS.2011.5940552, Baden-Baden, Germany, reference: pp. 1110-1115, Jun. 5-9, 2011.

Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France, Dec. 3-4, 2014.

Ben Othmane; Towards Extended Safety in Connected Vehicles; Proceedings of the 16th International IEEE Annual Conference on Intelligent Transportation Systems (ITSC 2013), The Hague, The Netherlands, Oct. 6-9, 2013.

Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014, On or before Aug. 29, 2014.

CAN protocol specification; http://www.can-cia.org/index.php?id=164, as accessed Aug. 29, 2014, Oct. 17, 2010.

Controller Area Network (CAN) Overview; http://www.ni.com/white-paper/2732/en/, as accessed Aug. 29, 2014; National Instruments Corporation, Aug. 1, 2014.

Driver Feedback; https://play.google.com/store/apps/details?id=com.statefarm.driverfeedback, as accessed Aug. 29, 2014; State Farm Insurance, Android Apps on Google Play, Jun. 2, 2013.

Electronic control unit; https://en.wikipedia.org/wiki/Electronic_control_unit, as accessed Feb. 9, 2015; Wikipedia, Jul. 28, 2004.

EMI/ESD Protection Solutions for the CAN Bus; http://www.onsemi.com/pub_link/Collateral/AND8169-D.PDF, as accessed Aug. 29, 2014; Publication Order No. AND8169/D, ON Semiconductor, Semiconductor Components Industries, LLC, Jun. 2014—Rev. 2.

Emulation; https://en.wikipedia.org/wiki/Emulation, as accessed Feb. 9, 2015; Wikipedia,Dec. 3, 2003.

(56) References Cited

OTHER PUBLICATIONS

FlexRay Automotive Communication Bus Overview; http://www.ni.com/white-paper/3352/en/, as accessed Aug. 29, 2014; National Instruments Corporation, Aug. 21, 2009.

Hardware emulation; https://en.wikipedia.org/wiki/Hardware_emulation, as accessed Feb. 9, 2015; Wikipedia, Sep. 13, 2006.

Koscher; Experimental Security Analysis of a Modern Automobile; http://www.autosec.org/pubs/cars-oakland2010.pdf, as accessed Feb. 9, 2015; 2010 IEEE Symposium on Security and Privacy, 2010.

Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation, 2005.

Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV, Aug. 2-7, 2014.

Regev; Automotive Ethernet Security Testing; http://standards.ieee.org/events/automotive/2014/20_Automotive_Ethernet_Security_Testing.pdf, as accessed Feb. 9, 2015, 2014.

Snapshot; https://www.progressive.com/auto/snapshot/, as accessed Aug. 29, 2014; Progressive Casualty Insurance Company, Mar. 8, 2013.

Vehicle bus; https://en.wikipedia.org/wiki/Vehicle_bus, as accessed Feb. 9, 2015; Wikipedia, May 12, 2005.

Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News, Mar. 19, 2014.

Wolf; Security in Automotive Bus Systems; http://www.weika.eu/papers/WolfEtAl_SecureBus.pdf, as accessed Aug. 29, 2014, 2004.

Vishal Bajpai et al.; System and Method for Identifying an Invalid Packet on a Controller Area Network (CAN) Bus; U.S. Appl. No. 15/056,864, filed Feb. 29, 2016.

Adam Glick, et al.; Systems and Methods for User-Directed Malware Remediation; U.S. Appl. No. 13/419,360, filed Mar. 13, 2012.

Carey Nachenberg, et al.; Systems and Methods for Neutralizing File-Format-Specific Exploits Included Within Files Contained Within Electronic Communications; U.S. Appl. No. 13/418,332, filed Mar. 12, 2012.

Leylya Yumer, et al.; Systems and Methods for Analyzing Zero-Day Attacks; U.S. Appl. No. 13/901,977, filed May 24, 2013.

Kyumin Lee, et al.; Content-Driven Detection of Campaigns in Social Media; CIKM'11; Oct. 24-28, 2011; ACM; Glasgow, Scotland, UK; http://faculty.cs.tamu.edu/caverlee/pubs/lee11cikm.pdf, as accessed Aug. 8, 2013.

Monowar H. Bhuyan, et al.; AOCD: An Adaptive Outlier Based Coordinated Scan Detection Approach; International Journal of Network Security; Nov. 2012; pp. 339-351; vol. 14, No. 6; http://www.cs.uccs.edu/~jkalita/papers/2012/BhuyanMonowarIJNS2012.pdf, as accessed Aug. 8, 2013.

William Eberle, et al., Graph-based approaches to insider threat detection; CSIIRW '09 Proceedings of the 5th Annual Workshop on Cyber Security and Information Intelligence Research: Cyber Security and Information Intelligence Challenges and Strategies; 2009; Article No. 44; ACM; http://dl.acm.org/citation.cfm?id=1558658, as accessed Aug. 8, 2013.

Splunk, Inc.; Detecting Advanced Persistent Threats—Using Splunk for APT; Jan. 4, 2012; Tech Brief; http://www.splunk.com/web_assets/pdfs/secure/Splunk_for_APT_Tech_Brief.pdf, as accessed Aug. 8, 2013.

Triumfant, Inc.; Detecting the Advanced Persistent Threat; Nov. 30, 2010; www.triumfant.com/advanced_persistent_threat.asp, as accessed Aug. 8, 2013.

EMC Corporation; Advanced Persistent Threat (APT) and Rootkit Detection; 2012; http://www.siliciumsecurity.com/advanced-persistent-threats-and-rootkits-detection/, as accessed Aug. 8, 2013.

Fanglu Guo, et al; Systems and Methods for Reducing False Positives When Using Event-Correlation Graphs to Detect Attacks on Computing Systems; U.S. Appl. No. 14/031,044, filed Sep. 19, 2013.

Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004), 138-142.

Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.

Julisch, Klaus "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.

Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.

Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).

Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.

Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).

Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.

Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.

(56) References Cited

OTHER PUBLICATIONS

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Bruce McCorkendale, et al; Systems and Methods for Detecting Malware; U.S. Appl. No. 13/422,702, filed Mar. 16, 2012.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, FireEye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, a FireEye Company, (Mar. 1, 2013).
"Mandiant for Intelligent Response", http://www.mandiant.com/products/mandiant-platform/intelligent-response, as accessed Feb. 6, 2014, Mandiant, a FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian, "Attackers used known exploit to steal customer log-in credentials, vBulletin maker says", http://www.networkworid.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).
Kevin Roundy, et al; Systems and Methods for Using Event-Correlation Graphs to Detect Attacks on Computing Systems; U.S. Appl. No. 14/041,762, filed Sep. 30, 2013.
Ilya Sokolov, et al; Systems and Methods for Notifying Contacts About the Status of Persons Impacted by Significant Unforeseen Events; U.S. Appl. No. 14/525,244, filed Oct. 28, 2014.
"Google now", http://www.google.com/landing/now/#whatisit, as accessed Aug. 28, 2014, (Jun. 28, 2012).
"Bing Maps", http://www.bing.com/maps/, as accessed Aug. 28, 2014, (Jun. 11, 2009).
"Google Now", https://plus.google.com/+google/posts/WhNRboMLynU, as accessed Aug. 18, 2015, (Mar. 29, 2014).
Keith Newstadt, et al; Systems and Methods for Validating Login Attempts Based on User Location; U.S. Appl. No. 14/197,687, filed Mar. 5, 2014.
Keith Newstadt; Systems and Methods for Validating Login Attempts Based on User Location; U.S. Appl. No. 14/735,195, filed Jun. 10, 2015.
Michael Shavell, et al; Systems and Methods for Storing Information About Transmission Control Protocol Connections; U.S. Appl. No. 14/314,263, filed Jun. 25, 2014.
Haas, Juergen; SYN flood; http://linux.about.com/cs/linux101/g/synflood.htm, as accessed Jul. 10, 2014; About.com.
Shane Pereira; Systems and Methods for Thwarting Illegitimate Initialization Attempts; U.S. Appl. No. 14/485,287, filed Sep. 12, 2014.
Hobgood, et al., Advanced Automatic Crash Notifications and, Urgency Factors: Can We Standardize?, APCO 2011, PowerPoint Slides, Jul. 22, 2012.
Asi, et al., Black Box System Design, Dec. 14, 2010.
Ignacio Bermudez Corrales, et al; Systems and Methods for Identifying Compromised Devices Within Industrial Control Systems; U.S. Appl. No. 14/952,344, filed Nov. 25, 2015.
Bolzoni; Poseidon: a 2-tier Anomaly-based Intrusion Detection System; http://doc.utwente.nl/54544/1/00000150.pdf, as accessed Sep. 29, 2015; International Workshop on Information Assurance, IEEE, London.
Caselli; Sequence-aware Intrusion Detection in Industrial Control Systems; CPSS'15, Proceedings of the 1st ACM Workshop on Cyber-Physical System Security, 2015.
Cisco Anomaly Guard Module; http://www.cisco.com/c/en/us/products/collateral/interfaces-modules/catalyst-6500-7600-router-anomaly-guard-module/product_data_sheet0900aecd80220a7c.html, as accessed Sep. 29, 2015; Document ID1457308823644728.
Distributed control system; https://en.wikipedia.org/wiki/Distributed_control_system, as accessed Sep. 29, 2015; Wikipedia.
Garitano; A Review of SCADA Anomaly Detection Systems; Advances in Intelligent and Soft Computing, 2016.
Ginter; Experience with Network Anomaly Detection on Industrial Networks; Industrial Control Systems Joint Working Group (ICSJWG), 2010.
Hadziosmanovi; N-Gram against the Machine: On the Feasibility of the N-Gram Network Analysis for Binary Protocols; Research in Attacks, Intrusions, and Defenses. 2012.
Kiss; Data Clustering-based Anomaly Detection in Industrial Control Systems; Intelligent Computer Communication and Processing, IEEE. 2014.
Mahoney; Phad: Packet Header Anomaly Detection for Identifying Hostile Network Traffic; https://cs.fit.edu/~mmahoney/paper3.pdf, as accessed Sep. 29, 2015.
Mantere; Network Traffic Features for Anomaly Detection in Specific Industrial Control System Network; Future Internet 2013, vol. 5 (6), MDPI.
Perdisci; McPad : A Multiple Classifier System for Accurate Payload-based Anomaly Detection; https://pralab.diee.unica.it/sites/default/files/Perdisci_COMNET2009.pdf, as accessed Sep. 29, 2015; Computer Networks, vol. 53, Issue 6.
Snort (software); https://en.wikipedia.org/wiki/Snort_(software), as accessed Sep. 29, 2015; Wikipedia.
The Bro Network Security Monitor; https://www.bro.org/, as accessed Sep. 29, 2015.

(56) References Cited

OTHER PUBLICATIONS

Wang; Anagram: A Content Anomaly Detector Resistant to Mimicry Attack; https://mice.cs.columbia.edu/getTechreport.php?techreportID=403&format=pdf&, as accessed Sep. 29, 2015; Recent Advances in Intrusion Detection.
Wang; Anomalous Payload-based Network Intrusion Detection; http://www.covert.io/research-papers/security/PAYL%20-%20Anomalous%20Payload-based%20Network%20Intrusion%20Detection.pdf, as accessed Sep. 29, 2015; Recent Advances in Intrusion Detection.
Walter Bogorad; Systems and Methods for Detecting Anomalies That Are Potentially Indicative of Malicious Attacks; U.S. Appl. No. 15/059,326, filed Mar. 3, 2016.
Aggarwal; Outlier Analysis; http://www.springer.com/us/book/9781461463955, as accessed Feb. 1, 2016, (2013).
Dunning; Practical Machine Learning: A New Look at Anomaly Detection; https://www.mapr.com/practical-machine-learning-new-look-anomaly-detection, as accessed Feb. 1, 2016, (Jul. 21, 2014).
Kind; Histogram-based traffic anomaly detection; http://ieeexplore.ieee.org/document/5374831/?arnumber=5374831, as accessed Feb. 1, 2016; IEEE Transactions on Network and Service Management, vol. 6, Issue 2, (Jun. 2009).
Wang; Network anomaly detection: A survey and comparative analysis of stochastic and deterministic methods; http://ieeexplore.ieee.org/document/6759879/?arnumber=6759879, as accessed Feb. 1, 2016; 2013 IEEE 52nd Annual Conference on Decision and Control (CDC), (Dec. 10-13, 2013).
Yolacan; Learning From Sequential Data for Anomaly Detection; https://repository.library.northeastern.edu/downloads/neu:349795, as accessed Feb. 1, 2016; Dissertation, (Oct. 2014).
Michael Sylvester Pukish, et al; Systems and Methods for Detecting Obscure Cyclic Application-Layer Message Sequences in Transport-Layer Message Sequences; U.S. Appl. No. 15/271,494, filed Sep. 21, 2016.
K. Nyalkalkar et al., "A comparative study of two network-based anomaly detection methods," in 2011 Proceedings IEEE INFOCOM, 2011.
S. Sinha et al., "WIND: Workload-Aware INtrusion Detection," in Recent Advances in Intrusion Detection, D. Zamboni and C. Kruegel, Eds. Springer Berlin Heidelberg, 2006.
L. Huang et al., "In-network PCA and anomaly detection," in In NIPS, 2006.
N. Goldenberg et al., "Accurate modeling of Modbus/TCP for intrusion detection in SCADA systems," Int. J. Crit. Infrastruct. Prot., vol. 6, No. 2, Jun. 2013.
M.-K. Yoon et al., "Communication Pattern Monitoring: Improving the Utility of Anomaly Detection for Industrial Control Systems," in Internet Society, San Diego, CA, USA, 2014.
N. Borisov et al., "Generic Application-Level Protocol Analyzer and its Language," Microsoft Research, MSR-TR-2005-133, Feb. 2005.
Zhipeng Zhao et al.; Systems and Methods for Identifying Message Payload Bit Fields in Electronic Communications; U.S. Appl. No. 15/359,076, filed Nov. 22, 2016.
"Transmission Control Protocol", http://en.wikipedia.org/wiki/Transmission_Control_Protocol, as accessed Jul. 10, 2014, Wikipedia, (Dec. 18, 2003).
A. Greenberg, "Hackers Remotely Kill a Jeep on the Highway—With Me in It," Wired, Jul. 21, 2015. [Online]. Available: http://www.wired.com/2015/07/hackers-remotely-kill-jeep-highway/. [Accessed: Mar. 30, 2016].
Steven Noel et al., "Correlating Intrusion Events and Building Attack Scenarios Through Attack Graph Distances", Computer Security Applications Conference, 2004. 20th Annual Tucson, AZ, USA Dec. 6-10, 2004, (Dec. 10, 2004), pp. 350-359.
Bayer; Automotive Security Testing—The Digital Crash Test; http://www.sia.fr/images/images/Image/Evenements/2014/CESA/available%20papers/09_Bayer_Escrypt.pdf, as accessed Feb. 9, 2015; 3rd CESA Automotive Electronics Congress (CESA 3.0), Paris, France.
Ben Othmane; Towards Extended Safety in Connected Vehicles; Proceedings of the 16th International IEEE Annual Conference on Intelligent Transportation Systems (ITSC 2013), The Hague, The Netherlands.
Bourns Type 6002 Non-contacting Steering Angle Sensor; http://www.we-conect.com/cms/media/uploads/events/415/dokumente/Bourns_-_Non-Contacting_Steering_Angle_Sensor_Type_6002.pdf, as accessed Aug. 29, 2014.
CAN protocol specification; http://www.can-cia.org/index.php?id=164, as accessed Aug. 29, 2014.
Controller Area Network (CAN) Overview; http://www.ni.com/white-paper/2732/en/, as accessed Aug. 29, 2014; National Instruments Corporation.
Driver Feedback; https://play.google.com/store/apps/details?id=com.statefarm.driverfeedback, as accessed Aug. 29, 2014; State Farm Insurance, Android Apps on Google Play.
Electronic control unit; https://en.wikipedia.org/wiki/Electronic_control_unit, as accessed Feb. 9, 2015; Wikipedia.
EMI/ESD Protection Solutions for the CAN Bus; http://www.onsemi.com/pub_link/Collateral/AND8169-D.PDF, as accessed Aug. 29, 2014; Publication Order No. AND8169/D, ON Semiconductor, Semiconductor Components Industries, LLC.
Emulation; https://en.wikipedia.org/wiki/Emulation, as accessed Feb. 9, 2015; Wikipedia.
FlexRay Automotive Communication Bus Overview; http://www.ni.com/white-paper/3352/en/, as accessed Aug. 29, 2014; National Instruments Corporation.
Hardware emulation; https://en.wikipedia.org/wiki/Hardware_emulation, as accessed Feb. 9, 2015; Wikipedia.
Kleberger; Security Aspects of the In-Vehicle Network in the Connected Car; Intelligent Vehicles Symposium (IV), 2011 IEEE, Baden-Baden, Germany.
Koscher; Experimental Security Analysis of a Modern Automobile; http://www.autosec.org/pubs/cars-oakland2010.pdf, as accessed Feb. 9, 2015; 2010 IEEE Symposium on Security and Privacy.
Lepkowski; EMI/ESD protection solutions for the CAN bus; http://www.can-cia.org/fileadmin/cia/files/icc/10/cia_paper_lepkowski.pdf, as accessed Aug. 29, 2014; iCC 2005, CAN in Automation.
Michael Pukish, et al; Systems and Methods for Detecting Transactional Message Sequences That Are Obscured in Multicast Communications; U.S. Appl. No. 15/194,337, filed Jun. 27, 2016.
Miller; A Survey of Remote Automotive Attack Surfaces; http://www.ioactive.com/pdfs/Remote_Automotive_Attack_Surfaces.pdf, as accessed Aug. 29, 2014; Black Hat USA 2014, Las Vegas, NV.
Muter; A structured approach to anomaly detection for in-vehicle networks; 2010 Sixth International Conference on Information Assurance and Security (IAS), Atlanta, GA.
Muter; Entropy-based anomaly detection for in-vehicle networks; 2011 IEEE Intelligent Vehicles Symposium (IV), DOI: 10.1109/IVS.2011.5940552, Baden-Baden, Germany.
Nathan Evans, et al; Systems and Methods for Detecting Anomalous Messages in Automobile Networks; U.S. Appl. No. 14/525,792, filed Oct. 28, 2014.
Nathan Evans, et al; Systems and Methods for Evaluating Electronic Control Units Within Vehicle Emulations; U.S. Appl. No. 14/671,036, filed Mar. 27, 2015.
Regev; Automotive Ethernet Security Testing; http://standards.ieee.org/events/automotive/2014/20_Automotive_Ethernet_Security_Testing.pdf, as accessed Feb. 9, 2015.
Snapshot; https://www.progressive.com/auto/snapshot/, as accessed Aug. 29, 2014; Progressive Casualty Insurance Company.
Vehicle bus; https://en.wikipedia.org/wiki/Vehicle_bus, as accessed Feb. 9, 2015; Wikipedia.
Volvo tests Cloud-based V2V ice warning concept; http://telematicsnews.info/2014/03/19/volvo-tests-cloud-based-v2v-ice-warning-sharing_m5202/, as accessed Aug. 29, 2014; Telematics News.
Wolf; Security in Automotive Bus Systems; http://www.weika.eu/papers/WolfEtAl_SecureBus.pdf, as accessed Aug. 29, 2014.
Yun Shen, et al; Systems and Methods for Detecting Discrepancies in Automobile-Network Data; U.S. Appl. No. 14/525,715, filed Oct. 28, 2014.

(56) References Cited

OTHER PUBLICATIONS

Extending schedulability analysis of Controller Area Network (CAN) for mixed (periodic/sporadic) messages (http://ieeexplore.ieee.org/document/6059010/); Sep. 5, 2011.

A structured approach to anomaly detection for in-vehicle networks (http://ieeexplore.ieee.org/stamp/stamp.jsp?arnumber=5604050); Aug. 23, 2010.

Intrusion Detection Systems (IDS) Part 2—Classification; methods; techniques (http://www.windowsecurity.com/articles-tutorials/intrusion_detection/IDS-Part2-Classification-methods-techniques.html); Jun. 15, 2014.

Vishal Bajpai et al.; Systems and Methods for Identifying Suspicious Controller Area Network Messages; U.S. Appl. No. 15/587,762, filed May 5, 2017.

Pukish et al., U.S. Appl. No. 15/194,337, filed Jun. 27, 2016.

Muter et al., A structured approach to anomaly detection for in-vehicle networks, 2010 Sixth International Conference on Information Assurance and Security (IAS), pp. 92-98, Aug. 23, 2010.

\* cited by examiner

SYSTEMS AND METHODS FOR DETECTING SUSPICIOUS MICROCONTROLLER MESSAGES

BACKGROUND

Many modern automobiles are controlled not just by the steering wheel, gas pedal, and brakes, but by a proliferation of microcontrollers known as electronic control units (ECUs). ECUs are often connected to the engine, transmission, cruise control, power steering, brakes, timing belts, suspension, and other parts of a vehicle. Because the functioning of all of these systems is crucial to the safety of a vehicle and its occupants, the possibility of a malicious attacker taking control of or spoofing an ECU is a serious threat. An attacker who successfully spoofs ECUs could cause brakes to fail, seriously damage the engine, change the vehicle's speed via cruise control, or endanger the vehicle and its occupants in a variety of other ways.

In most implementations, ECUs communicate using a controller area network (CAN). CAN networks do not intrinsically support any security features, meaning that any defense against attackers must be programmed into ECUs or added by an external service. While ECUs are extensively tested for automotive safety, they are typically not designed to be resistant to malicious electronic attacks. Traditional security systems design for other kinds of networks and computing devices may be entirely inadequate at securing electronic components of vehicles. Accordingly, the instant disclosure identifies and addresses a need for additional and improved systems and methods for detecting suspicious microcontroller messages.

SUMMARY

As will be described in greater detail below, the instant disclosure describes various systems and methods for detecting suspicious microcontroller messages by measuring the typical interval at which a microcontroller sends messages and flagging any message sent too far from the typical interval.

In one example, a computer-implemented method for detecting suspicious microcontroller messages may include (1) observing a typical interval at which messages are sent over a network by a microcontroller, (2) identifying a message sent over the network by the microcontroller, (3) determining that the interval between the message and a previous message sent by the microcontroller does not include the typical interval, and (4) categorizing the message as a suspicious message in response to determining that the interval does not include the typical interval.

In some examples, the computer-implemented method may further include performing a security action in response to categorizing the message as suspicious. In some embodiments, observing the typical interval may include observing a typical variation from the typical interval.

In one example, identifying the message may include identifying both a first message and a second message sent over the network by the microcontroller and determining that the interval between the message and the previous message is not the typical interval may include determining that the interval between the second message and the previous message is closer to the typical interval than the interval between the first message and the previous message. In this example, categorizing the message as the suspicious message may include categorizing the first message as the suspicious message in response to determining that the interval between the second message and the previous message is closer to the typical interval than the interval between the first message and the previous message.

Additionally or alternatively, identifying the message may include identifying both a first message and a second message sent over the network by the microcontroller and determining that the interval between the message and the previous message is not the typical interval may include: (1) determining that both an interval between the first message and the previous message and the interval between the second message and the previous message fall within a predetermined threshold of closeness to the typical interval, (2) identifying an additional message sent over the network by the microcontroller after the first message and the second message, and (3) determining that the interval between the second message and the additional message is closer to the typical interval than the interval between the first message and the additional message. In this example, categorizing the message as the suspicious message may include categorizing the first message as the suspicious message.

In some examples, identifying the message sent over the network by the microcontroller may include determining that the message may include a microcontroller identifier of the microcontroller. In one embodiment, the microcontroller may include an ECU. In one embodiment, the network may include a CAN. Additionally or alternatively, the microcontroller may send the messages to a system that is part of a motor vehicle.

In one embodiment, a system for implementing the above-described method may include (1) an observation module, stored in memory, that observes a typical interval at which messages are sent over a network by a microcontroller, (2) an identification module, stored in memory, that identifies a message sent over the network by the microcontroller, (3) a determination module, stored in memory, that determines that the interval between the message and a previous message sent by the microcontroller does not include the typical interval, (4) a categorization module, stored in memory, that categorizes the message as a suspicious message in response to determining that the interval does not include the typical interval, and (5) at least one physical processor configured to execute the observation module, the identification module, the determination module, and the categorization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) observe a typical interval at which messages are sent over a network by a microcontroller, (2) identify a message sent over the network by the microcontroller, (3) determine that the interval between the message and a previous message sent by the microcontroller does not include the typical interval, and (4) categorize the message as a suspicious message in response to determining that the interval does not include the typical interval.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
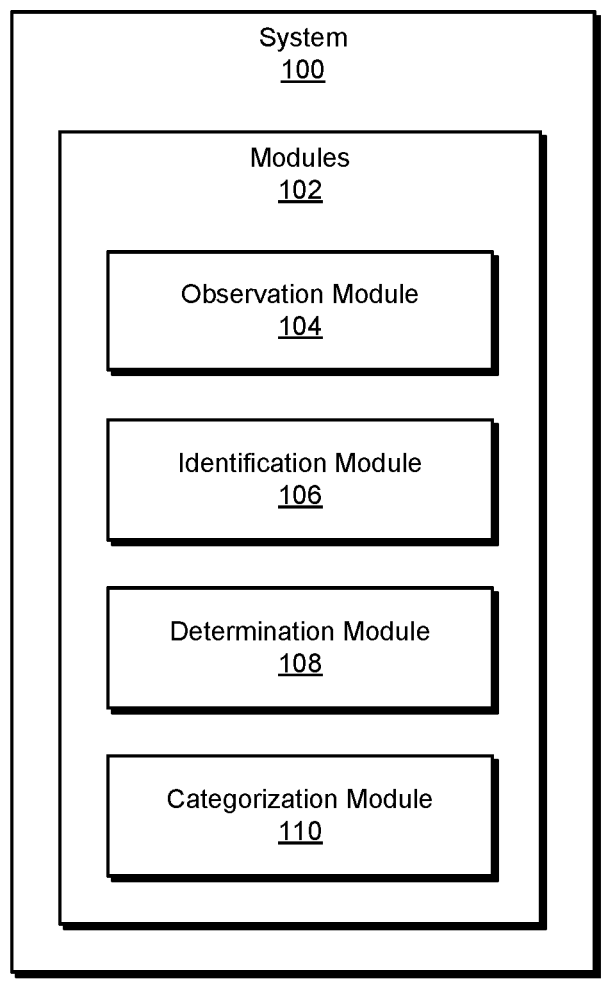
FIG. 1 is a block diagram of an exemplary system for detecting suspicious microcontroller messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting suspicious microcontroller messages. As will be explained in greater detail below, by monitoring the typical intervals at which messages are sent from an ECU while accounting for typical delays, the systems described herein may detect spoofed ECU messages created by an attacker that are sent at unusual intervals.

Figure 2:
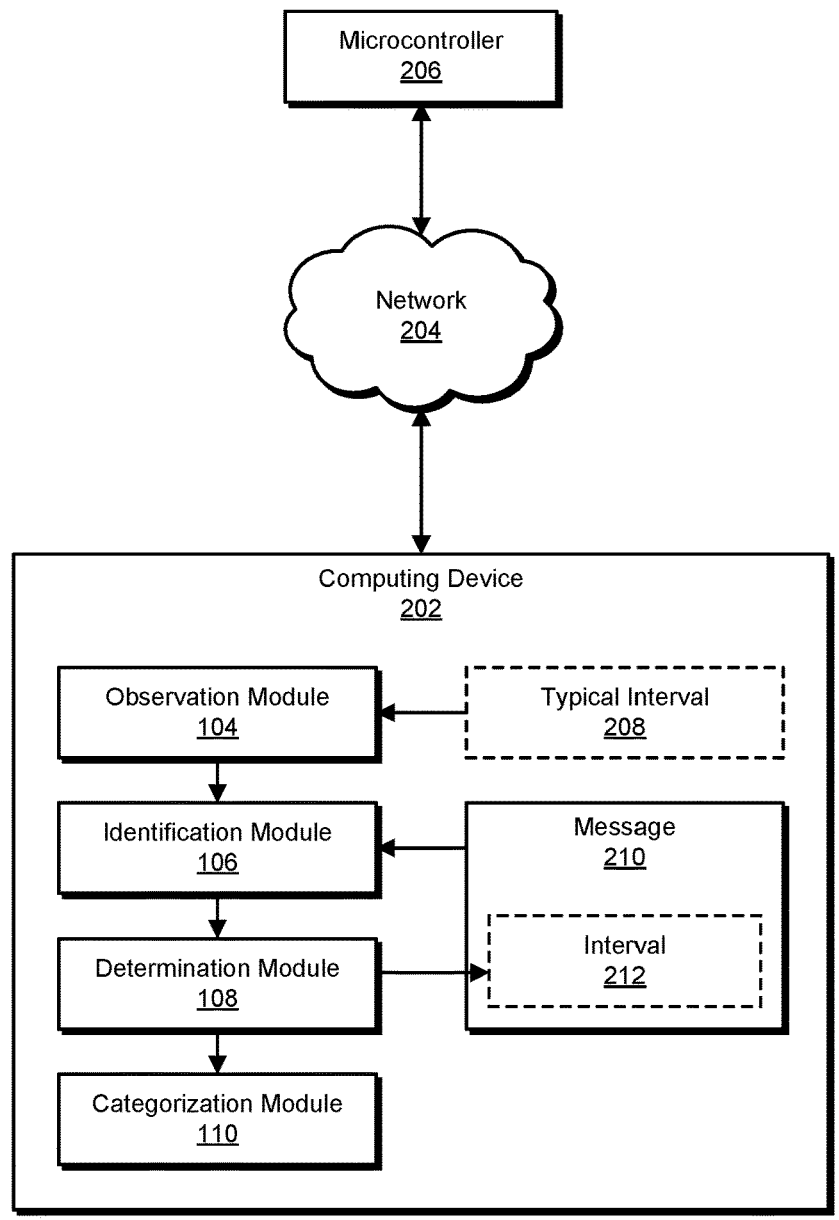
FIG. 2 is a block diagram of an additional exemplary system for detecting suspicious microcontroller messages.

The following will provide, with reference to FIGS. 1-2, detailed descriptions of exemplary systems for detecting suspicious microcontroller messages. Detailed descriptions of corresponding computer-implemented methods will also be provided in connection with FIG. 3. Detailed descriptions of exemplary microcontroller messages will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting suspicious microcontroller messages. As illustrated in this figure, exemplary system 100 may include one or more modules 102 for performing one or more tasks. For example, and as will be explained in greater detail below, exemplary system 100 may include an observation module 104 that observes a typical interval at which messages are sent over a network by a microcontroller. Exemplary system 100 may additionally include an identification module 106 that identifies a message sent over the network by the microcontroller. Exemplary system 100 may also include a determination module 108 that determines that the interval between the message and a previous message sent by the microcontroller is not the typical interval. Exemplary system 100 may additionally include a categorization module 110 that categorizes the message as a suspicious message in response to determining that the interval is not the typical interval. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or microcontroller 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a microcontroller 206 via a network 204. In one example, computing device 202 may be programmed with one or more of modules 102.

In one embodiment, one or more of modules 102 from FIG. 1 may, when executed by at least one processor of computing device 202, enable computing device 202 to detect suspicious microcontroller messages. For example, and as will be described in greater detail below, observation module 104 may observe a typical interval 208 at which messages are sent over a network 204 by a microcontroller 206. At some later time, identification module 106 may identify a message 210 sent over network 204 by microcontroller 206. Next, determination module 108 may determine that an interval 212 between message 210 and a previous message sent by microcontroller 206 is not typical interval 208. Finally, categorization module 110 may categorize message 210 as a suspicious message in response to determining that interval 212 is not typical interval 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Microcontroller 206 generally represents any type or form of computing device that is an embedded system with a dedicated function. In one embodiment, microcontroller 206 may include an ECU. Examples of ECUs that microcontroller 206 may represent may include, without limitation, a door control unit, an engine control unit, an electronic power steering control unit, a powertrain control module, a speed control unit, a telematics control unit, a transmission control unit, a brake control module, and/or a battery management system.

Figure 6:
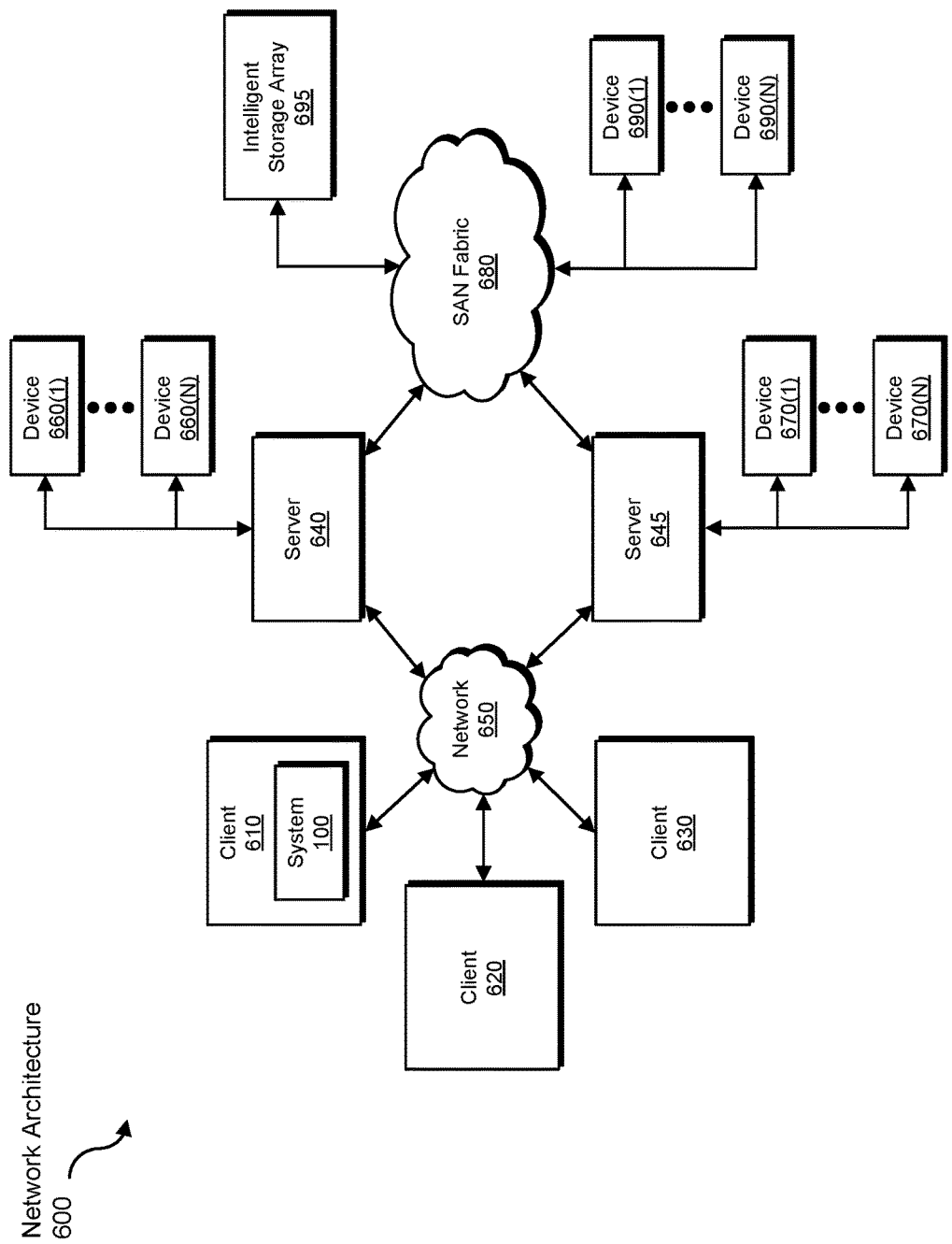
FIG. 6 is a block diagram of an exemplary computing network capable of implementing one or more of the embodiments described and/or illustrated herein.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM)

network), exemplary network architecture 600 in FIG. 6, or the like. Network 204 may facilitate communication or data transfer using wireless or wired connections. In one embodiment, network 204 may facilitate communication between computing device 202 and microcontroller 206. In some embodiments, network 204 may represent a CAN.

Figure 3:
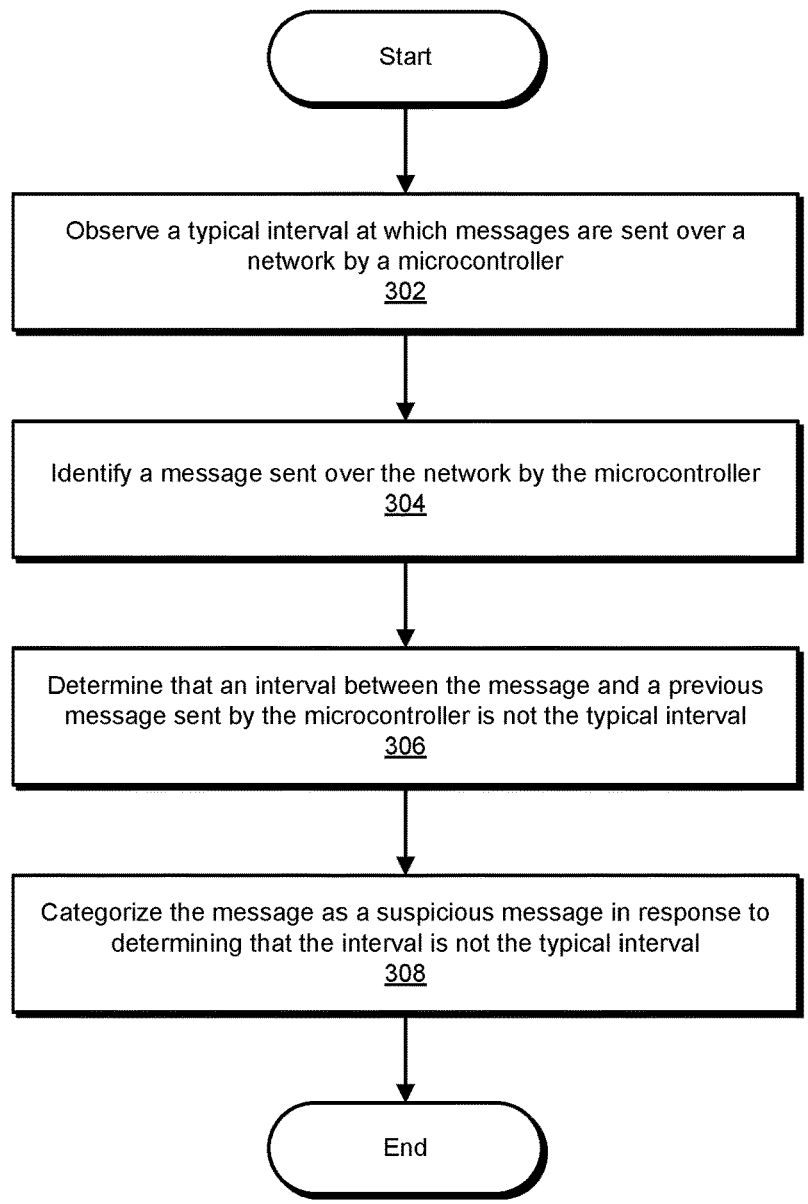
FIG. 3 is a flow diagram of an exemplary method for detecting suspicious microcontroller messages.

FIG. 3 is a flow diagram of an exemplary computer-implemented method 300 for detecting suspicious microcontroller messages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may observe a typical interval at which messages are sent over a network by a microcontroller. For example, observation module 104 may, as part of computing device 202 in FIG. 2, observe typical interval 208 at which messages are sent over network 204 by microcontroller 206.

The term "message," as used herein, generally refers to any data sent over a network. In some embodiments, a message may include a signal sent by an ECU.

The term "typical interval," as used herein, generally refers to any observed reoccurring period of time between messages. In some embodiments, a typical interval may include variation. For example, a typical interval may center around 100 milliseconds (ms) but may include any time between 95 and 105 ms.

Observation module 104 may observe the typical interval in a variety of ways. For example, observation module 104 may track the messages sent by a microcontroller for a predefined period of time and calculate the typical interval based on the average time between messages. In one embodiment, observation module 104 may determine which messages are sent by the microcontroller by examining a microcontroller identifier within the messages. In some embodiments, a microcontroller may send several different types of messages and each type of message may have a unique identifier (e.g., a CAN identifier). In these embodiments, observation module 104 may observe the intervals between each type of message separately, for example by using a CAN identifier to distinguish between message types. In one example, observation module 104 may observe that one type of message has a typical interval of 100 ms while another type of message from the same microcontroller has a typical interval of 40 ms.

In some examples, observation module 104 may observe the typical interval by observing a typical variation from the typical interval. For example, observation module 104 may observe that most messages are sent at exactly 100 ms intervals but that some messages may be delayed until up to 105 ms and that subsequent messages may arrive as early as 95 ms in order to reset the cycle. In this example, observation module 104 may determine that any message sent between 95 and 105 ms of the previous message falls within the typical interval.

In some embodiments, observation module 104 may observe that the typical interval for the message immediately following a delayed message is shortened by the time of the delay. For example, observation module 104 may observe that if most messages are sent at exactly 100 ms but one message is sent at 102 ms, the following message may be sent at 98 ms.

In one embodiment, observation module 104 may observe the microcontroller sending the messages to a system that is part of a motor vehicle. For example, the microcontroller may be an ECU sending messages to an engine, cruise control, or other system of a motor vehicle via a CAN.

At step 304, one or more of the systems described herein may identify a message sent over the network by the microcontroller. For example, identification module 106 may, as part of computing device 202 in FIG. 2, identify message 210 sent over network 204 by microcontroller 206.

The phrase "sent by the microcontroller," as used herein, refers to any message that appears to originate from the microcontroller. For example, a message sent by an attacker masquerading as the microcontroller may be initially identified by identification module 106 as having been sent by the microcontroller.

Identification module 106 may identify the message in a variety of ways. For example, identification module 106 may identify the message by determining that the message includes a microcontroller identifier of the microcontroller and/or a CAN identifier unique to a certain type of message sent by the microcontroller. In some embodiments, identification module 106 may separately monitor multiple types of messages sent by the same microcontroller. In some embodiments, identification module 106 may continuously monitor all messages sent over the network in order to identify messages sent by the microcontroller. Additionally or alternatively, identification module 106 may monitor messages from more than one microcontroller in order to detect potential illegitimate messages.

At step 306, one or more of the systems described herein may determine that an interval between the message and a previous message sent by the microcontroller is not the typical interval. For example, determination module 108 may, as part of computing device 202 in FIG. 2, determine that interval 212 between message 210 and a previous message sent by microcontroller 206 is not typical interval 208.

Figure 4:
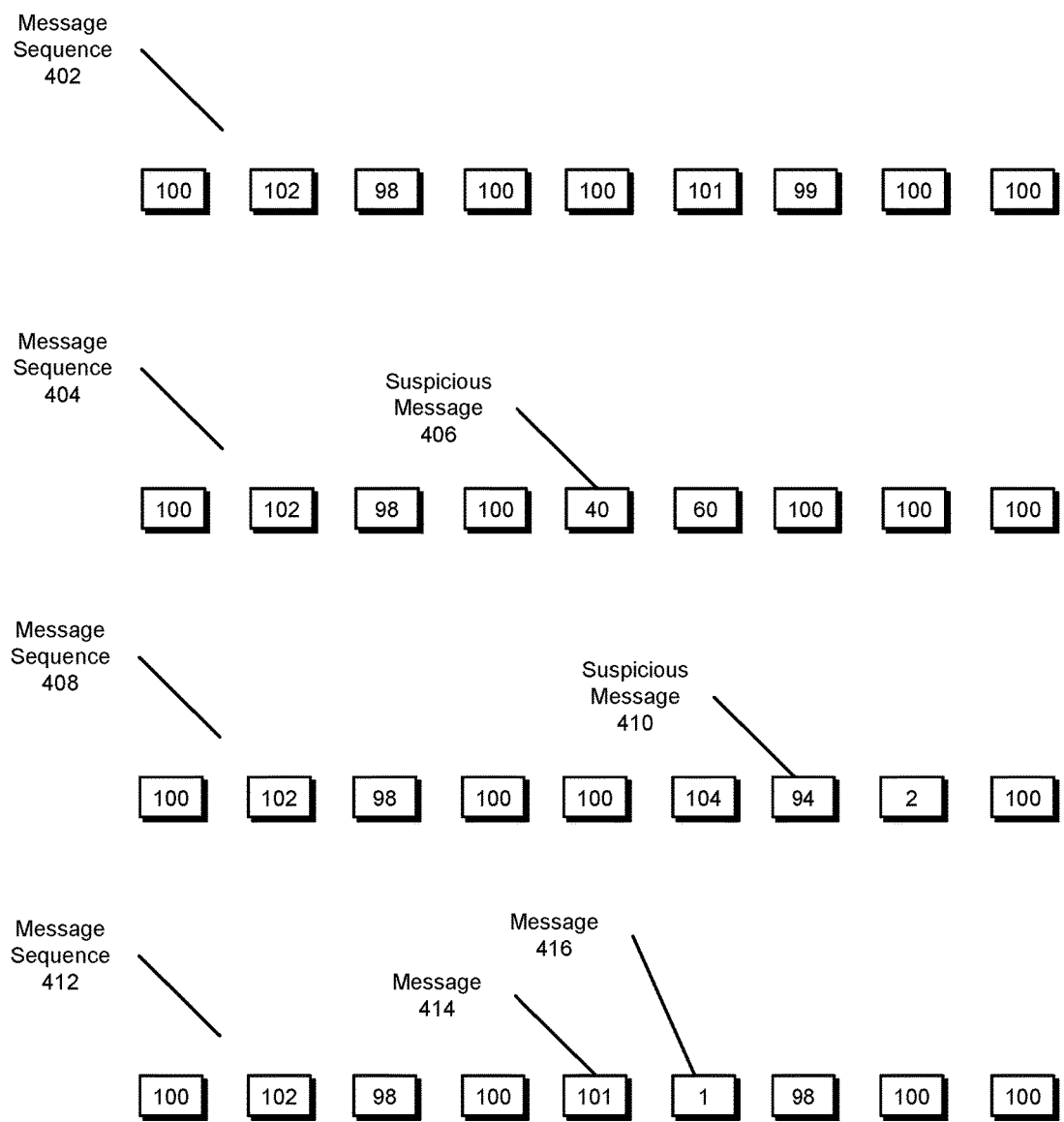
FIG. 4 is a block diagram of several sets of exemplary microcontroller messages.

Determination module 108 may determine that the interval is not the typical interval in a variety of ways. In some embodiments, determination module 108 may determine that the interval is not the typical interval between the message and a previous message of the same type sent by the same microcontroller (e.g., with the same CAN identifier). In some examples, determination module 108 may determine that the interval falls outside the typical variance of the typical interval. For example, as illustrated in FIG. 4, message sequence 402 may represent a typical message sequence where all of the messages come at a typical interval of 100 ms with a typical variation of 2 ms. In some examples, message sequence 404 may include a suspicious message 406. In this example, determination module 108 may determine that the interval between suspicious message 406 and the previous message is not the typical interval because the interval between suspicious message 406 and the previous message is 40 ms, which is nowhere near the typical interval of 100 ms+/−2 ms. In this example, the message after suspicious message 406 may have a 60 ms interval between itself and suspicious message 406 but a 100 ms interval between itself and the previous legitimate message.

In some embodiments, determination module 108 may determine that the message does not have the typical interval between itself and the previous message by determining that another message is closer to the typical interval than the message is.

For example, identification module 106 may identify both a first message and a second message sent over the network by the microcontroller and determination module 108 may determine that the interval between the second message and the previous message is closer to the typical interval than the interval between the first message and the previous message. The terms "first" and "second," as used herein, do not necessarily refer to the order of arrival; in some examples, the message described as the second message may arrive prior to the first message. For example, as illustrated in FIG. 4, message sequence 408 may include a suspicious message 410 that arrives 94 ms after the previous message. In this example, 94 ms may be within the typical interval. However, in this example, another message may arrive 2 ms after suspicious message 410 and 96 ms after the message immediately prior to suspicious message 410. In this example, because the prior message was delayed to 104 ms, a message at 96 ms may be expected in order to reset the interval cycle to 100 ms. Thus, the second message may be closer to the typical interval than the first message, and determination module 108 may determine that suspicious message 410 does not have the typical interval due to the second message being closer to the typical interval.

In another example, identification module 106 may identify both a first message and a second message and determination module 108 may determine that the interval between the message and the previous message is not the typical interval by (1) determining that both the interval between the first message and the previous message and the interval between the second message and the previous message fall within a predetermined threshold of closeness to the typical interval (e.g., the typical variation from the typical interval identified by observation module 104), (2) identifying an additional message sent over the network by the microcontroller after the first message and the second message, and (3) determining that the interval between the second message and the additional message is closer to the typical interval than the interval between the first message and the additional message. For example, as illustrated in FIG. 4, message sequence 412 may include a message 414 that arrives 101 ms after the previous message and a message 416 that arrives 1 ms after message 414 and a total of 102 ms after the previous message. In this example, both message 414 and message 416 may fall within 2 ms of the typical interval of 100 ms and thus it may not be immediately obvious which message is suspicious. In this example, determination module 108 may wait until the next message arrives at 98 ms and may then determine that message 414 did not arrive at the typical interval because the new message more closely compensates for the 2 ms delay of message 416 than it does the 1 ms delay of message 414. In some embodiments, all of the messages in message sequence 412 may be of the same type and/or include the same CAN identifier.

Returning to FIG. 3, at step 308, one or more of the systems described herein may categorize the message as a suspicious message in response to determining that the interval is not the typical interval. For example, categorization module 110 may, as part of computing device 202 in FIG. 2, categorize message 210 as a suspicious message in response to determining that interval 212 is not typical interval 208.

The term "suspicious message," as used herein, generally refers to any message that may have been created by a malicious attacker. For example, a suspicious message may be a spoofed message that does not originate from the microcontroller despite appearing to originate from the microcontroller (e.g., due to being labeled with the microcontroller identifier and/or CAN identifier).

Categorization module 110 may categorize the message as a suspicious message in a variety of circumstances. For example, categorization module 110 may categorize a message as suspicious after determination module 108 has determined that the message did not arrive within the typical interval after the previous message. In another example, categorization module 110 may categorize one of two closely-timed messages as suspicious in response to determination module 108 determining that the other message was closer to the typical interval than the suspicious message.

In some examples, categorization module 110 may perform a security action in response to categorizing the message as suspicious. In one embodiment, categorization module 110 may discard any message categorized as suspicious. In some examples, if the systems described herein require an additional message in order to determine which of two messages is suspicious, categorization module 110 may hold both messages until the additional message arrives. In some embodiments, categorization module 110 may alert an administrator about the suspicious message.

As explained in connection with method 300 above, the systems and methods described herein may protect motor vehicle networks from attack by using the typical timing cycles of ECUs to determine which signals are legitimate and which signals are forgeries created by an attacker. First, the systems described herein may observe one or more ECUs to determine what the typical interval is between signals sent by each ECU with a unique CAN identifier. The systems described herein may also determine an amount of delay that is typically associated with each interval. The systems described herein may then monitor all signals sent by the ECUs in order to identify signals that are sent at the wrong interval. If two signals both arrive close to the typical interval, the systems described herein may determine which signal is closest to the typical interval and thus most likely to be the legitimate signal. In some examples, systems described herein may hold potentially suspicious signals for observation while awaiting further signals. After identifying suspicious signals, the systems described herein may avoid forwarding the signals to their destination, preventing the attacker from gaining control of crucial systems such as the brakes, engine, and/or cruise control of a vehicle.

Figure 5:
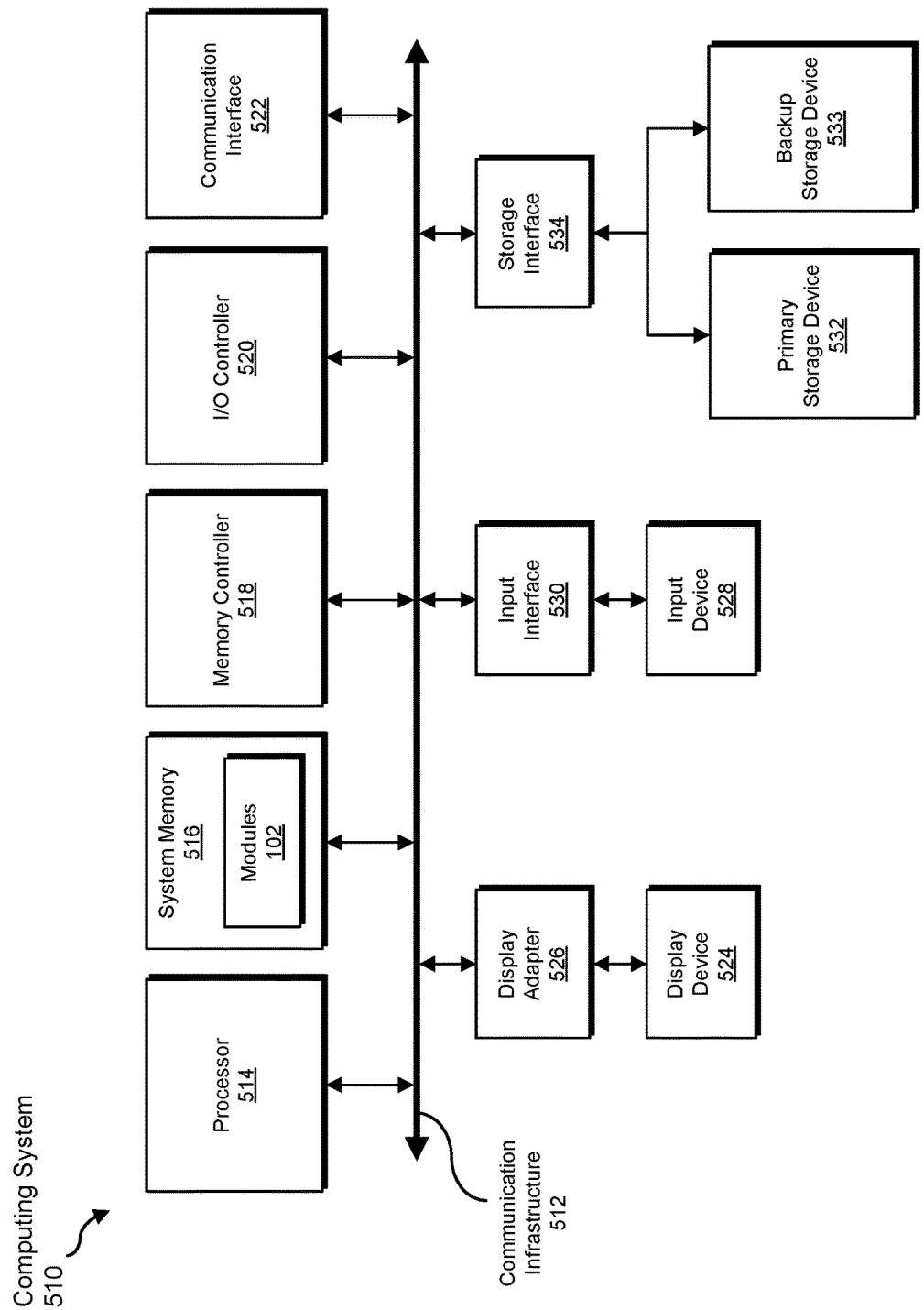
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting suspicious microcontroller messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive message data to be transformed, transform the message data into a typical interval at which messages are sent, output a result of the transformation to a variable, use the result of the transformation to determine whether future intervals are typical, and store the result of the transformation to a file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting suspicious microcontroller messages, at least a portion of the method being performed by a computing device comprising at least one processor, the method comprising:
   observing a typical interval at which messages are sent over a network by a microcontroller, the messages being sent over the network at a target time and a delay time after the target time, wherein the typical interval for new messages sent over the network immediately following the messages sent after the target time comprises the target time shortened by the delay time;
   identifying a message sent over the network by the microcontroller;
   determining that an interval between the message and a previous message sent by the microcontroller does not comprise the typical interval;
   categorizing the message as a suspicious message in response to determining that the interval does not comprise the typical interval; and
   performing a security action in response to categorizing the message as suspicious, the security action comprising holding the suspicious message until an arrival of an additional message at the computing device, wherein the computing device is in communication with the network utilized by the microcontroller and wherein the additional message is determined not to be suspicious, and discarding the suspicious message to prevent an attacker from gaining control of one or more systems that are part of a motor vehicle and that are associated with operating the motor vehicle, wherein the suspicious message comprises a spoofed message that does not originate from the microcontroller despite appearing to originate from the microcontroller.

2. The computer-implemented method of claim 1, wherein observing the typical interval comprises observing a typical variation from the typical interval.

3. The computer-implemented method of claim 1, wherein:
   identifying the message comprises identifying both a first message and a second message sent over the network by the microcontroller;
   determining that the interval between the message and the previous message does not comprise the typical interval comprises determining that an interval between the second message and the previous message is closer to the typical interval than an interval between the first message and the previous message;
   categorizing the message as the suspicious message comprises categorizing the first message as the suspicious message in response to determining that the interval between the second message and the previous message is closer to the typical interval than the interval between the first message and the previous message.

4. The computer-implemented method of claim 1, wherein:
   identifying the message comprises identifying both a first message and a second message sent over the network by the microcontroller;
   determining that the interval between the message and the previous message does not comprise the typical interval comprises:
      determining that both an interval between the first message and the previous message and an interval between the second message and the previous message fall within a predetermined threshold of closeness to the typical interval;
      identifying an additional message sent over the network by the microcontroller after the first message and the second message;
      determining that an interval between the second message and the additional message is closer to the typical interval than an interval between the first message and the additional message;
   categorizing the message as the suspicious message comprises categorizing the first message as the suspicious message in response to determining that an interval between the second message and the additional message is closer to the typical interval than an interval between the first message and the additional message.

5. The computer-implemented method of claim 1, wherein identifying the message sent over the network by the microcontroller comprises determining that the message comprises a microcontroller identifier of the microcontroller.

6. The computer-implemented method of claim 1, wherein the microcontroller comprises an electronic control unit.

7. The computer-implemented method of claim 1, wherein the network comprises a controller area network.

8. The computer-implemented method of claim 1, wherein the microcontroller sends the messages to a system that is part of a motor vehicle.

9. The computer-implemented method of claim 1, wherein the spoofed message comprises a message labeled with a controller area network identifier.

10. A system for detecting suspicious microcontroller messages, the system comprising:
    an observation module, stored in memory, that observes a typical interval at which messages are sent over a network by a microcontroller, the messages being sent over the network at a target time and a delay time after the target time, wherein the typical interval for new messages sent over the network immediately following the messages sent after the target time comprises the target time shortened by the delay time;

an identification module, stored in memory, that identifies a message sent over the network by the microcontroller;

a determination module, stored in memory, that determines that an interval between the message and a previous message sent by the microcontroller does not comprise the typical interval;

a categorization module, stored in memory, that categorizes the message as a suspicious message in response to determining that the interval does not comprise the typical interval, wherein the categorization module further performs a security action in response to categorizing the message as suspicious, the security action comprising holding the suspicious message until an arrival of an additional message at a computing device in communication with the network utilized by the microcontroller, wherein the additional message is determined not to be suspicious, and discarding the suspicious message to prevent an attacker from gaining control of one or more systems that are part of a motor vehicle and that are associated with operating the motor vehicle, wherein the suspicious message comprises a spoofed message that does not originate from the microcontroller despite appearing to originate from the microcontroller; and at least one physical processor configured to execute the observation module, the identification module, the determination module, and the categorization module.

11. The system of claim 10, wherein the observation module observes the typical interval by observing a typical variation from the typical interval.

12. The system of claim 10, wherein:
the identification module identifies the message by identifying both a first message and a second message sent over the network by the microcontroller;
the determination module determines that the interval between the message and the previous message does not comprise the typical interval by determining that an interval between the second message and the previous message is closer to the typical interval than an interval between the first message and the previous message;
the categorization module categorized the message as the suspicious message by categorizing the first message as the suspicious message in response to determining that the interval between the second message and the previous message is closer to the typical interval than the interval between the first message and the previous message.

13. The system of claim 10, wherein:
the identification module identifies the message by identifying both a first message and a second message sent over the network by the microcontroller;
the determination module determines that the interval between the message and the previous message does not comprise the typical interval by:
determining that both an interval between the first message and the previous message and an interval between the second message and the previous message fall within a predetermined threshold of closeness to the typical interval;
identifying an additional message sent over the network by the microcontroller after the first message and the second message;
determining that an interval between the second message and the additional message is closer to the typical interval than an interval between the first message and the additional message;
the categorization module categorizes the message as the suspicious message by categorizing the first message as the suspicious message in response to determining that an interval between the second message and the additional message is closer to the typical interval than an interval between the first message and the additional message.

14. The system of claim 10, wherein the identification module identifies the message sent over the network by the microcontroller by determining that the message comprises a microcontroller identifier of the microcontroller.

15. The system of claim 10, wherein the microcontroller comprises an electronic control unit.

16. The system of claim 10, wherein the network comprises a controller area network.

17. The system of claim 10, wherein the microcontroller sends the messages to a system that is part of a motor vehicle.

18. The system of claim 10, wherein the spoofed message comprises a message labeled with a controller area network identifier.

19. A non-transitory computer-readable medium comprising one or more computer-readable instructions that, when executed by at least one processor of a computing device, cause the computing device to:
observe a typical interval at which messages are sent over a network by a microcontroller, the messages being sent over the network at a target time and a delay time after the target time, wherein the typical interval for new messages sent over the network immediately following the messages sent after the target time comprises the target time shortened by the delay time;
identify a message sent over the network by the microcontroller;
determine that an interval between the message and a previous message sent by the microcontroller does not comprise the typical interval;
categorize the message as a suspicious message in response to determining that the interval does not comprise the typical interval; and
perform a security action in response to categorizing the message as suspicious, the security action comprising holding the suspicious message until an arrival of an additional message at the computing device, wherein the computing device is in communication with the network utilized by the microcontroller and wherein the additional message is determined not to be suspicious, and discarding the suspicious message to prevent an attacker from gaining control of one or more systems that are part of a motor vehicle and that are associated with operating the motor vehicle, wherein the suspicious message comprises a spoofed message that does not originate from the microcontroller despite appearing to originate from the microcontroller.

20. The non-transitory computer-readable medium of claim 19, wherein the spoofed message comprises a message labeled with a controller area network identifier.

* * * * *